United States Patent
Zweig et al.

(10) Patent No.: US 11,485,368 B2
(45) Date of Patent: Nov. 1, 2022

(54) SYSTEM AND METHOD FOR REAL-TIME CUSTOMIZATION OF PRESENTATION FEATURES OF A VEHICLE

(71) Applicant: Intuition Robotics, Ltd., Ramat-Gan (IL)

(72) Inventors: Shay Zweig, Harel (IL); Roy Amir, Mikhmoret (IL); Itai Mendelsohn, Tel Aviv-Jaffa (IL); Dor Skuler, Oranit (IL)

(73) Assignee: Intuition Robotics, Ltd., Ramat-Gan (IL)

( * ) Notice: Subject to any disclaimer, the term of this patent is extended or adjusted under 35 U.S.C. 154(b) by 314 days.

(21) Appl. No.: 16/913,682

(22) Filed: Jun. 26, 2020

(65) Prior Publication Data

US 2020/0406903 A1    Dec. 31, 2020

Related U.S. Application Data

(60) Provisional application No. 62/867,322, filed on Jun. 27, 2019.

(51) Int. Cl.

| | |
|---|---|
| *B60W 40/09* | (2012.01) |
| *B60W 50/14* | (2020.01) |
| *G06N 20/00* | (2019.01) |
| *B60Q 1/50* | (2006.01) |
| *B60Q 5/00* | (2006.01) |
| *B60Q 9/00* | (2006.01) |

(52) U.S. Cl.
CPC ............ *B60W 40/09* (2013.01); *B60Q 1/525* (2013.01); *B60Q 1/535* (2022.05); *B60Q 5/006* (2013.01); *B60Q 9/006* (2013.01); *B60W 50/14* (2013.01); *G06N 20/00* (2019.01); *B60W 2050/146* (2013.01); *B60W 2540/043* (2020.02); *B60W 2540/30* (2013.01); *B60W 2555/20* (2020.02)

(58) Field of Classification Search
CPC ................ B60W 40/09; B60W 50/14; B60W 2050/146; B60W 2540/043; B60W 2555/20; B60Q 1/525; B60Q 1/535; B60Q 5/006; B60Q 9/006; B60K 2370/152; B60K 2370/179; B60K 35/00; B60K 2370/161; B60K 2370/175; G06N 20/00

See application file for complete search history.

(56) References Cited

U.S. PATENT DOCUMENTS 10,108,191 B2   10/2018  Pilluti et al.
10,252,729 B1 *  4/2019  Goldman-Shenhar ...................... B60W 40/09

(Continued)

*Primary Examiner* — Ojiako K Nwugo
(74) *Attorney, Agent, or Firm* — M&B IP Analysts, LLC

(57) ABSTRACT

A controller and method for real-time customization of presentation features of a vehicle. A method includes collecting a first dataset about a knowledge level of an operator of the vehicle, wherein the first dataset is collected with respect to a feature of the vehicle; collecting, using at least one sensor, a second dataset regarding an external environment of the vehicle and a cabin of the vehicle; determining, based on the first dataset and the second dataset, a presentation feature from a plurality of presentation features associated with the feature of the vehicle; customizing the presentation feature based on at least the first dataset, wherein the customization is performed in real-time when the operator operates the vehicle; and presenting the presentation feature to the operator of the vehicle.

19 Claims, 3 Drawing Sheets

(56) References Cited

U.S. PATENT DOCUMENTS

| | | | |
|---|---|---|---|
| 10,752,260 B2* | 8/2020 | Oe ........................ | B60W 40/09 |
| 10,783,725 B1* | 9/2020 | Gaudin .................. | G07C 5/008 |
| 10,948,911 B2* | 3/2021 | Upmanue ........... | B60W 30/182 |
| 2017/0038774 A1* | 2/2017 | Ebina ..................... | B60R 16/02 |
| 2017/0293841 A1* | 10/2017 | McAllister ............ | H04L 67/146 |
| 2017/0369072 A1 | 12/2017 | Huber | |
| 2017/0369073 A1 | 12/2017 | Huber | |
| 2018/0105184 A1* | 4/2018 | Urano .................. | G05D 1/0061 |
| 2018/0170373 A1* | 6/2018 | Kwon .................... | G08G 1/165 |
| 2019/0077416 A1* | 3/2019 | Ueno .................... | G02B 6/0011 |
| 2019/0315346 A1* | 10/2019 | Yoo ....................... | B60W 50/12 |
| 2020/0223450 A1* | 7/2020 | Iwamoto ............... | B60W 60/00 |
| 2021/0269045 A1* | 9/2021 | Katz ..................... | B60W 50/16 |

* cited by examiner

SYSTEM AND METHOD FOR REAL-TIME CUSTOMIZATION OF PRESENTATION FEATURES OF A VEHICLE

CROSS-REFERENCE TO RELATED APPLICATIONS

This application claims the benefit of U.S. Provisional Application No. 62/867,322 filed on Jun. 27, 2019, the contents of which are hereby incorporated by reference.

TECHNICAL FIELD

The disclosure generally relates to autonomous and semi-autonomous vehicle systems and, more specifically, to systems and methods for real-time customization of presentation features of one or more vehicles.

BACKGROUND

Modern vehicles, such as semi-autonomous vehicles, are regularly equipped with advanced systems and features which allow the vehicle to perform valuable and, occasionally, life-saving, actions with great accuracy. Advanced features may include for example, parking assistance features, area view features, adaptive cruise control, and the like, which may assist a driver in controlling a semi-autonomous vehicle. In many cases, even though important and potentially-life-saving features are available for use, the driver may not be aware of whether such features are activated.

Some solutions introduced by the prior art describe systems by which the identity of the driver is determined. Based on determination of the driver's identity, the system or systems may determine which semi-autonomous features are flagged for training based on a driver profile. When a driver activates one of the flagged semi-autonomous features, the system provides an audiovisual description which includes description of the semi-autonomous feature, a usage guide for the semiautonomous feature, a description of limitations of the semiautonomous feature, and, in some cases, a demonstration of alerts generated by the semi-autonomous feature. One disadvantage of such prior art solutions is that such solutions do not consider real-time circumstances in which the driver may be confused, stressed, or inexperienced in operating the semi-autonomous features.

Therefore, it would be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the terms "some embodiments" or "certain embodiments" may be used herein to refer to a single embodiment or multiple embodiments of the disclosure.

Certain embodiments disclosed herein include a method for real-time customization of presentation features of a vehicle. The method comprises: collecting a first dataset about a knowledge level of an operator of the vehicle, wherein the first dataset is collected with respect to a feature of the vehicle; collecting, using at least one sensor, a second dataset regarding an external environment of the vehicle and a cabin of the vehicle; determining, based on the first dataset and the second dataset, a presentation feature from a plurality of presentation features associated with the feature of the vehicle; customizing the presentation feature based on at least the first dataset, wherein the customization is performed in real-time when the operator operates the vehicle; and presenting the presentation feature to the operator of the vehicle.

Certain embodiments disclosed herein also include a non-transitory computer readable medium having stored thereon instructions for causing a processing circuitry to execute a process, the process comprising: collecting a first dataset about a knowledge level of an operator of the vehicle, wherein the first dataset is collected with respect to a feature of the vehicle; collecting, using at least one sensor, a second dataset regarding an external environment of the vehicle and a cabin of the vehicle; determining, based on the first dataset and the second dataset, a presentation feature from a plurality of presentation features associated with the feature of the vehicle; customizing the presentation feature based on at least the first dataset, wherein the customization is performed in real-time when the operator operates the vehicle; and presenting the presentation feature to the operator of the vehicle. Certain embodiments disclosed herein also include a controller for real-time customization of presentation features presentation of a vehicle. The controller comprises: a processing circuitry; and a memory, the memory containing instructions that, when executed by the processing circuitry, configure the system to: collect a first dataset about a knowledge level of an operator of the vehicle, wherein the first dataset is collected with respect to a feature of the vehicle; collect, using at least one sensor, a second dataset regarding an external environment of the vehicle and a cabin of the vehicle; determine, based on the first dataset and the second dataset, a presentation feature from a plurality of presentation features associated with the feature of the vehicle; customize the presentation feature based on at least the first dataset, wherein the customization is performed in real-time when the operator operates the vehicle; and present the presentation feature to the operator of the vehicle.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
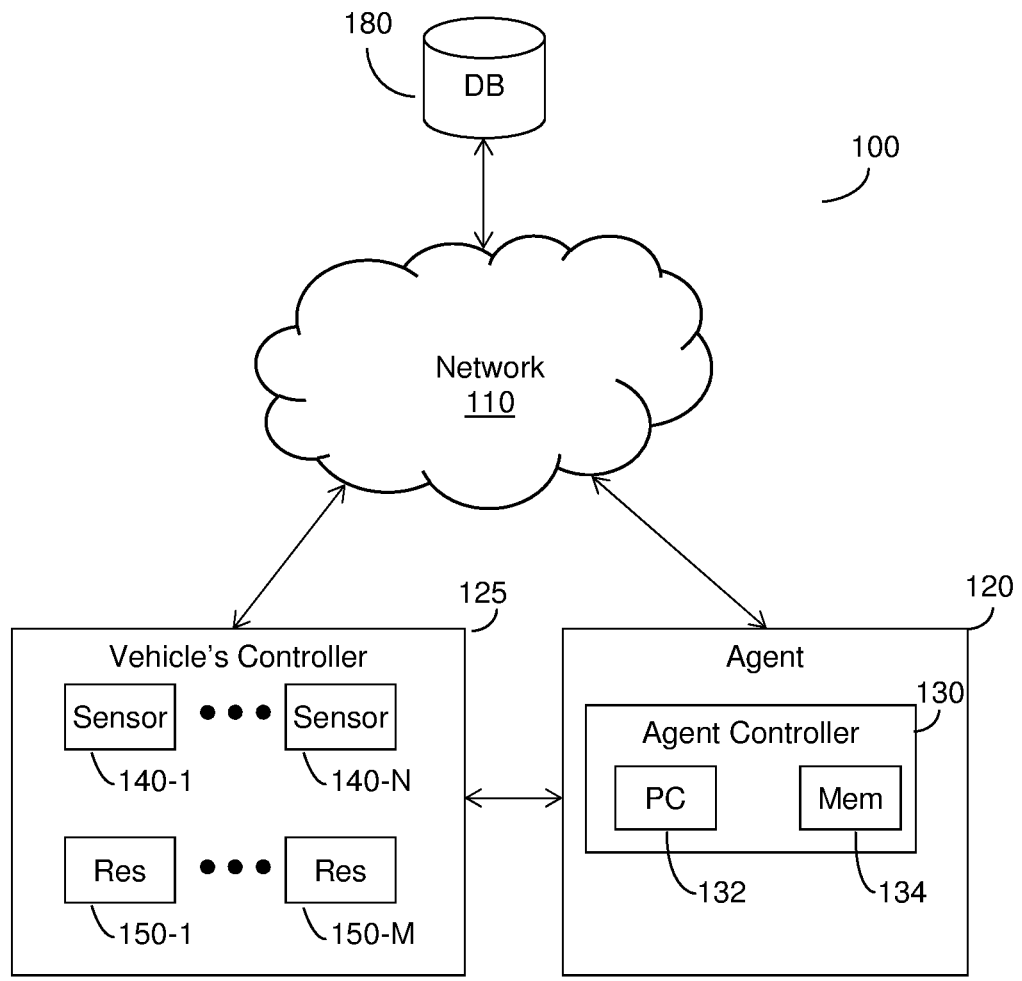
FIG. 1 is a network diagram of a system for real-time customization of features presentation of a vehicle, according to an embodiment.

The embodiments disclosed are only examples of the many possible advantageous uses and implementations of the innovative teachings presented herein. In general, statements made in the specification of the present application do not necessarily limit any of the various claimed disclosures. Moreover, some statements may apply to some inventive features but not to others. In general, unless otherwise indicated, singular elements may be in plural and vice versa with no loss of generality. In the drawings, like numerals refer to like parts through several views.

By way of example with respect to the disclosed embodiments, a system and method, as described hereinbelow, are utilized for the purpose of collecting a first set of data describing a knowledge level of an operator of a vehicle, and a second set of data relating to the external environment of the vehicle and the cabin of the vehicle. The collected data is then utilized to customize a presentation feature for display in the vehicle.

FIG. 1 is an example diagram of a system 100 for real-time customization of presentation features of a vehicle, according to an embodiment. The system 100 includes an agent 120 and a vehicle's controller 125. In some embodiments, the agent 120 is further connected to a network, where the network 110 is used to communicate between different parts of the system 100. The network 110 may be, but is not limited to, a local area network (LAN), a wide area network (WAN), a metro area network (MAN), the Internet, a wireless, cellular or wired network, and the like, and any combination thereof.

The vehicle may be a fully autonomous vehicle, a semi-autonomous vehicle, a traditional vehicle, an aerial vehicle, a vessel, another, like, vehicle, as well as any combination thereof. A vehicle operator may access the agent 120 directly, such as via a voice command or an input device connected directly to the agent 120, or indirectly through the network 110, such as through an application on a mobile phone connected to the internet, where the agent 120 is additionally connected to the internet.

In an embodiment, the agent 120 may include an agent controller 130, described in greater detail in FIG. 2, below. The agent controller 130 having at least a processing circuitry 132 and a memory 134. The vehicle's controller 125 may be an electronic module designed to control the operation of a vehicle such as an autonomous vehicle, a semi-autonomous vehicle, and the like.

The vehicle's controller 125 may include, or may be communicatively connected to, one or more sensors 140-1 to 140-N, where N is an integer equal to or greater than 1 (hereinafter referred to as "sensor" 140 or "sensors" 140 for simplicity) and one or more electronic resources 150-1 to 150-M, where M is an integer equal to or greater than 1 (hereinafter referred to as "resource" 150 or "resources" 150 for simplicity).

The sensors 140 may include input devices, such as microphones, touch sensors, motion detectors, proximity sensors, blind spots sensors, cameras, other, like, devices, and any combination thereof. Any of the sensors 140 may be, but are not, necessarily, communicatively or otherwise connected to the vehicle's controller 125.

The electronic resources 150 may include display units, speakers, lighting systems, heads-up displays (HUDs), and the like, as well as any combination thereof. In an embodiment, the resources 150 may also be parts of the vehicle such as windows, a trunk actuator, wipers, other, like, parts, as well as any combination thereof.

In an embodiment, the sensors 140, as well as the electronic resources 150, may be communicatively connected to, and controlled by, the agent controller 130 (such a connection is not included in FIG. 1 for the sake of simplicity and without limitation of the disclosed embodiments). The sensors 140 may be configured to sense signals from the internal environment of the vehicle and from the external environment of the vehicle, as further described hereinbelow. Further, the sensors 140 may be positioned inside the vehicle and outside the vehicle. In an embodiment, the agent 120 may have a direct link to, for example and without limitation, the vehicle's controller 125, a controller area network (CAN) bus of the vehicle, and the like, for the purpose of receiving data inputs and executing plans, processes, or methods, as may be further described herein below.

As further explained in more detail below, the agent 120 uses the agent controller 130 for determining whether one or more features of the vehicle may assist the vehicle's operator in operating the vehicle based on the operator's knowledge level regarding the available features of the vehicle and the vehicle's internal and external environment. Upon selecting a presentation feature, the agent controller 130 customizes, in real-time or near-real-time, the selected presentation feature based on at least the operator's knowledge level regarding the available features of the vehicle and presents, in real-time, the customized presentation.

A presentation feature is related to a feature (function) provided by, for example, an automated driving system (ADS) of a vehicle. The vehicle may be an autonomous vehicle, a semi-autonomous vehicle, and any modern vehicle with an ADS. The vehicle's features may include parking assistance, area view features, adaptive cruise control, blind spot detection, navigation instructions, and the like. The presentation feature is the presentation information related to a respective feature. According to the disclosed embodiments, a customized presentation feature is provided based on a current knowledge, cognitive state, or both, of a vehicle operator. For example, a presentation of a parking assistance feature may be very elaborated when the vehicle operator is not familiar with the parking assistance feature, and less elaborated when the user is more experienced in using the parking assistance feature.

In an embodiment, a customized presentation feature of a vehicle's feature that is appropriate with respect to the knowledge level of the operator, regarding the available vehicle's feature, and the internal and external environment of the vehicle, allows for the automatic suggestion, in real-time, of life-saving features, features of which the operator was not aware and which may assist the user in a particular scenario, and the like. The knowledge level of the operator may be also indicative of a cognitive state of the operator.

In an embodiment, the system 100 further includes a database 180. The database 180 may be stored within the agent 120, such as within a storage device (not shown), or may be separate from the agent 120 and connected therewith via the network 110. The database 180 may store one or more predetermined presentation features to be executed, using the resources 150, as further described hereinbelow.

According to another embodiment, the database 180 may have stored therein historical data associated with the vehicle's operator. The historical data may be retrieved from the database 180 and used to determine, for example, the most effective way of using the resources 150, considering a specific identified vehicle's operator. For example, when the vehicle's operator is identified as a new operator and the vehicle is located in a narrow parking spot, the agent controller 130 may be configured to suggest that the new operator use an automatic parking-assist feature using an elaborated presentation of the feature. However, in the same example, after three successful uses of the automatic park-assist feature by the operator, the agent controller 130 may use a different, and less elaborate, presentation, if any, when the vehicle is located, once again, in a narrow parking spot.

Figure 2:
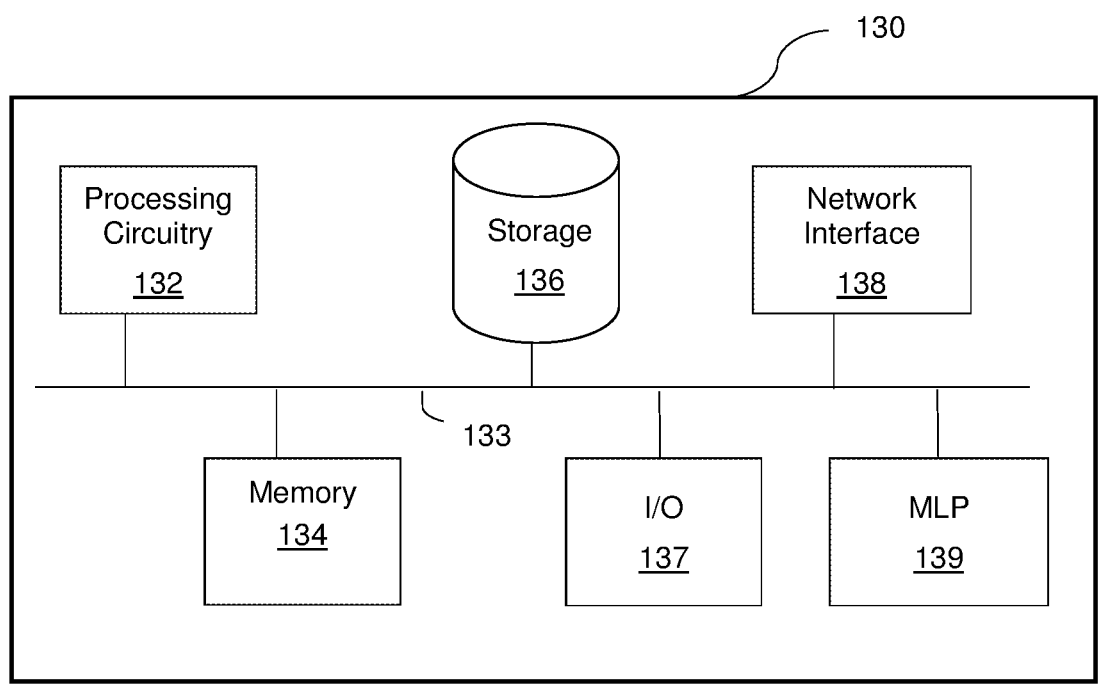
FIG. 2 shows a schematic block diagram of an agent controller, according to an embodiment.

FIG. 2 shows an example schematic block diagram of an agent controller 130 of an agent, such as the agent, 120 of FIG. 1, above, according to an embodiment. The agent controller 130 includes a processing circuitry 132 configured to receive data, analyze data, generate outputs, and the like, as further described hereinbelow. The processing circuitry 132 may be realized as one or more hardware logic components and circuits. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic component that can perform calculations or other manipulations of information, as well as any combination thereof.

The processing circuitry 132 is coupled via a bus 133 to a memory 134. The memory 134 may contain therein instructions which, when executed by the processing circuitry 132, cause the agent controller 130 to execute actions as further described hereinbelow. The memory 134 may further store therein information, such as data associated with predetermined features and presentation features that may be executed by one or more resources, such as the electronic resources, 150, of FIG. 1, above. The memory 134 may be configured as a working-memory scratch-pad, including data values generated during calculations which may be subsequently applicable to further operations. Further, information may be stored in the storage 136, in the memory 134, or in both the storage 136 and the memory 134.

In an embodiment, the agent controller 130 includes a network interface 138 configured to connect to a network, such as the network, 110, of FIG. 1, above. The network interface 138 may include, but is not limited to, a wired interface, such as an Ethernet port, or a wireless port, such as an 802.11-compliant Wi-Fi card, which may be configured to connect to a network (not shown).

In an embodiment, the agent controller 130 may include an input/output (I/O) interface 137 which may be configured to control one or more resources, such as the resources, 150, of FIG. 1, above. In an embodiment, the I/O interface 137 is configured to receive one or more signals captured by sensors, such as the sensors, 140, of FIG. 1, above, and send the captured signals to the processing circuitry 132 for analysis. According to one embodiment, the I/O interface 137 may be configured to analyze the signals captured by the various devices including, without limitation, detectors, sensors, such as the sensors, 140, of FIG. 1, above, other, like, devices, and any combination thereof. According to a further embodiment, the I/O interface 137 is configured to send one or more commands to one or more resources, such as the resources, 150, of FIG. 1, above, for executing one or more presentation features as further described hereinbelow.

The agent controller 130 may further include a machine learning processor (MLP) 139. The MLP 139 may be configured to perform machine learning based on input data received from data sources such as, for example and without limitation, the sensors 140, a vehicle's controller 125, a global positioning system (GPS) of the vehicle, an operator's predetermined information, other, like, data sources, and any combination thereof.

In an embodiment, the MLP 139 is further configured to facilitate the agent controller 130 to determine, using on one or more machine learning models, an appropriate at least one presentation feature from a plurality of presentation features. To that end, the MLP 139 may use collected data that is associated with the knowledge level of an operator of the vehicle with respect to at least one feature, and data that is associated with the external environment of the vehicle and the vehicle's cabin. In an embodiment, the MLP 139 is further configured to select a presentation feature that is appropriate based on the identified circumstances, such as operator data, external environment data, vehicle's cabin data, other, like, circumstances, and any combination thereof.

In an embodiment, the agent controller 130 collects a first set of data regarding the knowledge level of an operator of a vehicle with respect to at least one feature of the vehicle. The vehicle may be a fully autonomous vehicle, a semi-autonomous vehicle, a traditional vehicle, an aerial vehicle, a vessel, another, like vehicle, or a vehicle including a combination of the aspects thereof. The operator may be a driver, a potential driver, an occupant, a passenger, or the like, as well as any combination thereof. In an embodiment, the operator may be located near the controlling mechanism of the vehicle. The features of the vehicle may include, for example, automatic park-assist features, adaptive cruise control features, lane assist features, light assist features, area view features, and other, like, features. The knowledge level of the operator with respect to one or more features of the vehicle indicates whether the operator is familiar with a specific feature, the operator's level of familiarity with the vehicle, other, like, information, and any combination or subset thereof.

In an embodiment, the first set of data may be collected by, for example, the sensors 140, and may include sensor data that is associated with the operator. For example, the operator may be identified as a new and elderly operator, using the collected sensor data. According to a further embodiment, the first set of data may be inputted by the operator. For example, the agent controller 130 may emit a question, using the speakers and the display unit of the vehicle, asking a new operator whether he or she is familiar with a specific feature. Thus, the operator's answer may be used for determining the operator's knowledge level with respect to the vehicle's features.

In an embodiment, the agent controller 130 is configured to collect, using one or more sensors, such as the sensors 140, of FIG. 1, above, a second set of data of the external environment of the vehicle and the cabin of the vehicle. With regard to the external environment, the second set of data may indicate, for example, an exact location of an obstacle that is located in front of the vehicle, a person that is walking on a sidewalk and getting too close to the road, an upcoming traffic jam, a narrow parking spot at which the vehicle is located, and the like. With regard to the sensor, such as the sensor 140, of FIG. 1, above, data that is collected from the cabin, such as the internal environment of the vehicle, the second set of data, may indicate, for example, the identity of one or more occupants of the vehicle, the interactions between the occupants, the interaction between an agent, such as the agent, 120, of FIG. 1, above, and the operator, the temperature within the vehicle's cabin, whether the operator is concentrated on the road or not, and other, like, data, as well as any combination thereof. In an embodiment, the second set of data may also be received or collected from, for example, the internet, one or more databases, other, like, sources, and any combination thereof.

In an embodiment, the agent controller 130 is further configured to determine, based on the first set of data and the second set of data, at least one presentation feature from a plurality of presentation features. In an embodiment, the determination of the at least one presentation feature may be achieved by applying one or more machine learning algorithms, using the MLP 139, to at least the second set of data. By applying the one or more machine learning algorithms, the agent controller 130 is configured to detect the circumstances inside and outside the vehicle. Thus, by analyzing the first set of data with an output of the one or more machine learning algorithms, one or more presentation features, which are appropriate with respect to the operator's knowledge level and the circumstances, are determined.

According to a further embodiment, the determination may be achieved based on analysis of the first set of data and the second set of data by at least a predetermined rule. Such a predetermined rule may indicate on an appropriate presentation feature based on a current identified scenario which is determined based on the collected first set and second set of data. A rule may indicate, for example, that when the user's knowledge level with respect to a parking-assist feature is below a predetermined threshold, there is a lot of noise within the cabin, and the vehicle is located in a narrow parking spot, a visual presentation feature suggesting to use the park-assist feature will be selected. According to another embodiment, the determination may be achieved using the aforementioned one or more machine learning algorithms, the one or more predetermined rules, and the like, as well as any combination thereof.

The plurality of presentation features may include several different indicators to present the same feature, as well as several indicators to present several different features. For example, for the purpose of presenting the adaptive cruise control feature to the operator, a first indicator may use only vocal notification, a second indicator may use both vocal and visual notifications, a third indicator may use a long and elaborate explanation, a fourth indicator may use a short explanation, and the like.

In an embodiment, the agent controller 130 is configured to select one or more indicators provided by a presentation feature. The selection may be achieved based on the collected first set of data and the second set of data. More specifically, the selection may be achieved based on the result of the analysis of the first set of data and the second set of data, as further described hereinabove.

The selected first feature may include displaying a twenty-second video on the vehicle's touchscreen display, for explaining to a new operator a certain feature that the operator is not familiar with. It should be noted that the agent controller 130 may identify that the operator is sitting within the moving vehicle while an auto-pilot feature is activated and, based on the identification, the agent controller 130 may present a feature that the operator is not familiar with, using a selected presentation feature that is customized, as further discussed hereinbelow, based on the current identified scenario and the operator's knowledge level of the vehicle's features.

In an embodiment, the agent controller 130 is configured to customize, such as in real-time, the selected indicator(s), based on at least the first set of data. In an embodiment, the customization is achieved based on the second set of data as well. The customization may include, for example, selecting the elaboration level of the selected first feature, selecting the tone, the volume, or both, of a vocal explanation, selecting whether to use a visual element to present the selected feature, a vocal notification, other, like, customizations, and any combination thereof. For example, the agent controller 130 may identify that the operator is not familiar with the parking-assist feature at all, and that the vehicle is located in a narrow parking spot, therefore the agent controller 130 may customize the parking-assist presentation feature such that an elaborated explanation, that includes both visual and vocal elements, may be presented.

In an embodiment, the agent controller 130 is configured to present, in real-time, the customized presentation feature. The presentation may be performed using at least one electronic component of the vehicle, such as the vehicle controller 125, of FIG. 1. The vehicle controller 125 may control the vehicle's sound system, display unit, head-up display (HUD), and the like, as well as any combination thereof.

According to another embodiment, when the operator tries to use a certain feature incorrectly, such as by performing an incorrect sequence of actions when using the parking-assist feature, the agent controller 130 may update the first set of data respectively. That is, the knowledge level of the operator with respect to features such as the park-assist feature is updated and determined to be relatively low. Therefore, and according to the same example, in certain circumstances, the agent controller 130 may select one of the parking-assist presentation features, customize the parking-assist presentation feature based on the first set of data that indicates the previous incorrect usage, and display the customized presentation feature.

It should be noted that one or more of the vehicle's features may include more than one usage. For example, a parking-assist feature may enable the performance of vertical auto-parking as well as parallel auto-parking. Therefore, according to an embodiment, if the user is well aware of a certain part, such as usage of a certain vehicle's feature, but not of all parts of the feature, the first set of data is updated respectively by the agent controller 130. Then, based on the circumstances, the agent controller 130 selects a presentation feature that is associated with the neglected part of the partially-known feature, customizes the presentation feature based on the first set of data, such as the user's knowledge, and displays the customized presentation feature.

Figure 3:
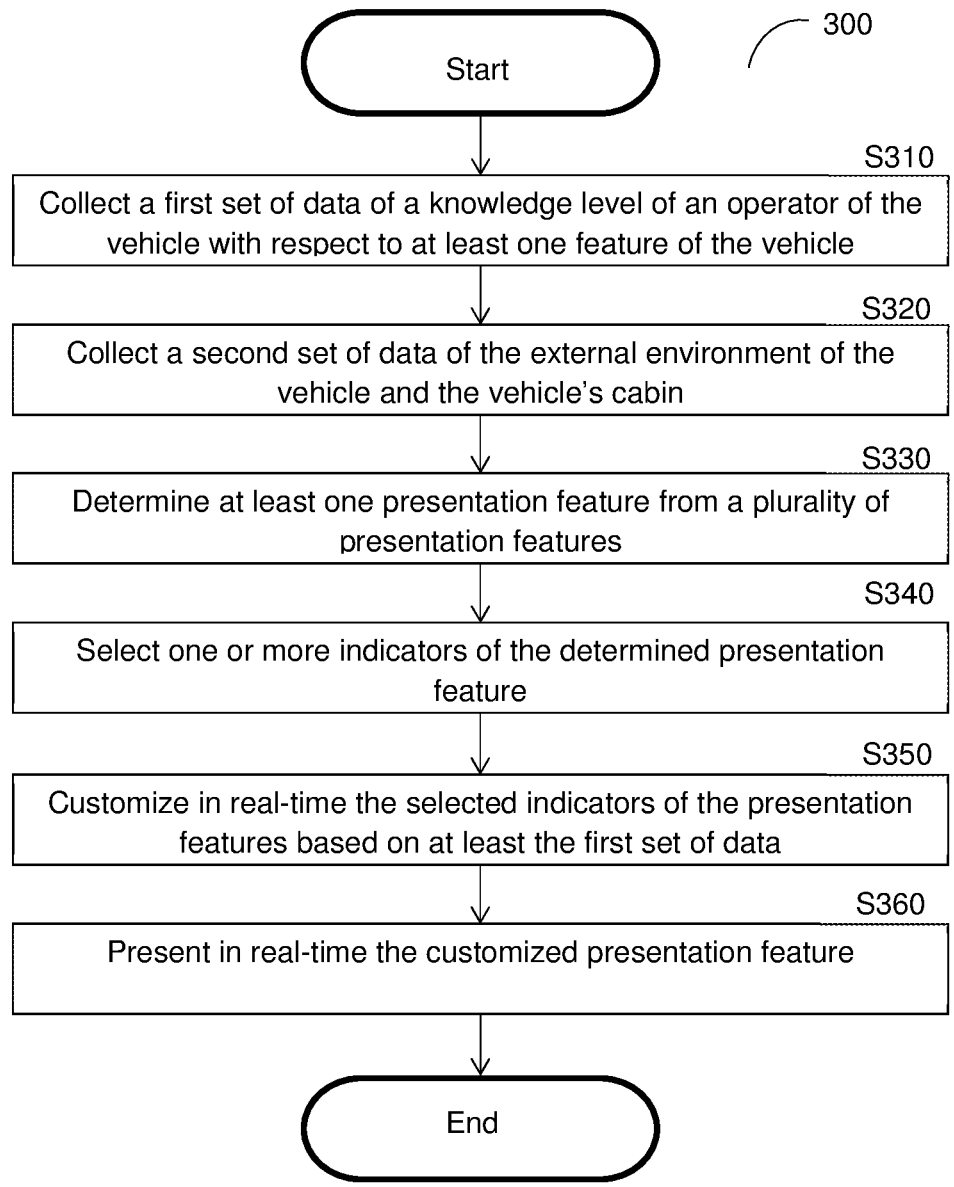
FIG. 3 shows a flowchart of a method for real-time customization of presentation features of a vehicle, according to an embodiment.

FIG. 3 shows an example flowchart 300 of a method for real-time customization of presentation features of a vehicle, according to an embodiment. In an embodiment, the method is performed by a controller, such as the agent controller, 130, of FIG. 1, above.

At S310, a first set of data relating to the knowledge level of an operator of the vehicle is collected with respect to at least one feature of the vehicle as further described hereinabove. The vehicle may be a fully autonomous vehicle, a semi-autonomous vehicle, a traditional vehicle, an aerial vehicle, a vessel, another, like vehicle, or any combination thereof. The operator may be the driver, a potential driver, an occupant, a passenger, or the like. Data relating to the knowledge level of an operator may describe the operator's training, skill, comfort, and other, like, factors describing the operator's knowledge level regarding the vehicle and any component features. It may be understood that data is collected, using the sensors through time, about the user, where the number of times that each feature has been accessed or used is counted.

At S320, a second set of data regarding the external environment of the vehicle and the vehicle's cabin is collected. The collection may be achieved using one or more sensors, such as the sensors, 140, of FIG. 1, above. The sensors, such as the sensors, 140, of FIG. 1, above, may include input devices, such as various sensors, detectors, microphones, touch sensors, motion detectors, cameras, and the like. The second set of data may include data describing the vehicle's internal and external conditions including, without limitation, internal climate settings, weather reports, vehicle systems alerts, operating time, maintenance schedules, and other, like, aspects of the vehicle's internal and external conditions.

At S330, at least one presentation feature is determined from a plurality of presentation features based on the first set of data and the second set of data. In an embodiment, the determination may be achieved by applying a machine learning model on the second set of data and then analyzing the first set of data with the output of the machine learning model used to process the first dataset. According to a further embodiment, the determination may include analyzing the first set of data and the second set of data by at least one predetermined rule, as further described hereinabove.

At S340, one or more indicators of the determined presentation feature are selected. The indicators, and the selection thereof, may be similar or identical to those described with respect to FIG. 2, above.

At S350, the selected one or more indicators of the determined presentation feature may be customized in real-time, or near real-time, based on at least the first set of data, as further described hereinabove with respect to FIG. 2. S350 may include analyzing the first set of data and the second set of data and, based on the result of the analysis, the agent may customize the selected indicators to suit the user and the circumstances.

At S360, the customized presentation feature is presented in real-time, using at least one electronic component of the vehicle, such as the resources, 150, of FIG. 1, above, the vehicle's speakers, display unit, head-up display (HUD), and the like, as well as any combination thereof.

It should be noted that, as described herein, the term "machine learning model" refers to models which may be generated using artificial intelligence (AI) methods that can provide computers with the ability to learn without being explicitly programmed. To this end, example machine learning models can be generated, trained, or programmed using methods including, but not limited to, fuzzy logic, prioritization, scoring, and pattern detection. The disclosed embodiments can be realized using a supervised learning model in which inputs are linked to outputs via a training data set, an unsupervised machine learning model when input data set is not initially labeled, a semi-supervised machine learning model, or any combination thereof.

The various embodiments disclosed herein may be implemented as hardware, firmware, software, or any combination thereof. Moreover, software may be preferably implemented as an application program tangibly embodied on a program storage unit or computer readable medium. The application program may be uploaded to, and executed by, a machine comprising any suitable architecture. Preferably, the machine may be implemented on a computer platform having hardware such as one or more central processing units (CPUs), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform, such as an additional data storage unit and a printing unit.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

A person skilled in the art will readily note that other embodiments of the disclosure may be achieved without departing from the scope of the disclosure. All such embodiments are included herein. The scope of the disclosure should be limited solely by the claims thereto.

What is claimed is:

1. A method for real-time customization of presentation features of a vehicle, comprising:
    collecting a first dataset about a knowledge level of an operator of the vehicle, wherein the first dataset is collected with respect to a feature of the vehicle;
    collecting, using at least one sensor, a second dataset regarding an external environment of the vehicle and a cabin of the vehicle;
    determining, based on the first dataset and the second dataset, a presentation feature from a plurality of presentation features associated with the feature of the vehicle;
    customizing the presentation feature based on at least the first dataset, wherein the customization is performed in real-time when the operator operates the vehicle; and
    presenting the presentation feature to the operator of the vehicle.

2. The method of claim 1, wherein determining the at least one presentation feature further comprises:
    applying a machine learning model on the collected second dataset; and
    analyzing the first dataset with an output of the machine learning model.

3. The method of claim 1, wherein the presentation feature includes a plurality of indicators.

4. The method of claim 1, further comprising:
selecting one or more indicators of the presentation feature; and
individually customizing each of the selected one or more indicators.

5. The method of claim 1, wherein the knowledge level of the operator is further indicative of a cognitive state of the operator.

6. The method of claim 5, wherein the knowledge level of the operator is further indicative of any one of: training, skill, and comfort of the operator with the feature.

7. The method of claim 1, wherein the feature of the vehicle is any function of any automated driving system of the vehicle.

8. The method of claim 1, wherein the first dataset is collected using at least one sensor.

9. The method of claim 1, wherein the second dataset includes data related to conditions of the vehicle.

10. A non-transitory computer readable medium having stored thereon instructions for causing a processing circuitry to execute a process, the process comprising:
collecting a first dataset about a knowledge level of an operator of the vehicle, wherein the first dataset is collected with respect to a feature of the vehicle;
collecting, using at least one sensor, a second dataset regarding an external environment of the vehicle and a cabin of the vehicle;
determining, based on the first dataset and the second dataset, a presentation feature from a plurality of presentation features associated with the feature of the vehicle;
customizing the presentation feature based on at least the first dataset, wherein the customization is performed in real-time when the operator operates the vehicle; and
presenting the presentation feature to the operator of the vehicle.

11. A controller for real-time customization of presentation features presentation of a vehicle, comprising:
a processing circuitry; and
a memory, the memory containing instructions that, when executed by the processing circuitry, configure the system to:
collect a first dataset about a knowledge level of an operator of the vehicle, wherein the first dataset is collected with respect to a feature of the vehicle;
collect, using at least one sensor, a second dataset regarding an external environment of the vehicle and a cabin of the vehicle;
determine, based on the first dataset and the second dataset, a presentation feature from a plurality of presentation features associated with the feature of the vehicle;
customize the presentation feature based on at least the first dataset, wherein the customization is performed in real-time when the operator operates the vehicle; and
present the presentation feature to the operator of the vehicle.

12. The controller of claim 11, wherein the controller is further configured to:
apply a machine learning model on the collected second dataset; and
analyze the first dataset with an output of the machine learning model.

13. The controller of claim 11, wherein the presentation feature includes a plurality of indicators.

14. The controller of claim 11, wherein the controller is further configured to:
select one or more indicators of the presentation feature; and
individually customize each of the selected one or more indicators.

15. The controller of claim 11, wherein the knowledge level of the operator is further indicative of a cognitive state of the operator.

16. The controller of claim 15, wherein the knowledge level of the operator is further indicative of any one of: training, skill, and comfort of the operator with the feature.

17. The controller of claim 11, wherein the feature of the vehicle is any function of any automated driving system of the vehicle.

18. The controller of claim 11, wherein the first dataset is collected using at least one sensor.

19. The controller of claim 11, wherein the second dataset includes data related to conditions of the vehicle.

* * * * *